(12) United States Patent
Hiraoka et al.

(10) Patent No.: US 7,674,349 B2
(45) Date of Patent: Mar. 9, 2010

(54) METHOD FOR CONTINUOUS PRODUCTION OF A FUNCTIONAL FILM

(75) Inventors: Hideki Hiraoka, Nagoya (JP); Kouzou Kubota, Nagoya (JP); Takeo Yamaguchi, Kawasaki (JP); Shyusei Ohya, Ichihara (JP); Hiroshi Harada, Ichihara (JP)

(73) Assignee: Toagosei Co., Ltd., Tokyo (JP)

( * ) Notice: Subject to any disclaimer, the term of this patent is extended or adjusted under 35 U.S.C. 154(b) by 727 days.

(21) Appl. No.: 10/570,609

(22) PCT Filed: May 12, 2004

(86) PCT No.: PCT/JP2004/006389

§ 371 (c)(1),
(2), (4) Date: Dec. 26, 2006

(87) PCT Pub. No.: WO2005/023921

PCT Pub. Date: Mar. 17, 2005

(65) Prior Publication Data
US 2008/0216942 A1    Sep. 11, 2008

(30) Foreign Application Priority Data
Sep. 3, 2003    (JP)    ............... 2003-311841

(51) Int. Cl.
*B32B 37/18* (2006.01)
*B32B 37/20* (2006.01)
*B29C 63/00* (2006.01)

(52) U.S. Cl. ............... 156/344; 156/289; 210/500.21

(58) Field of Classification Search ............ 156/247, 156/289, 344; 428/315.5, 419; 210/500.21; 427/244, 246, 340
See application file for complete search history.

(56) References Cited

U.S. PATENT DOCUMENTS

| | | | | |
|---|---|---|---|---|
| 3,601,159 A | * | 8/1971 | Marks et al. ............... | 138/101 |
| 3,612,282 A | * | 10/1971 | Cheng ............... | 210/321.89 |
| 3,648,845 A | * | 3/1972 | Riley ............... | 210/490 |
| 3,951,815 A | * | 4/1976 | Wrasidlo ............... | 210/500.27 |
| 4,151,053 A | * | 4/1979 | Seko et al. ............... | 205/521 |
| 4,374,933 A | * | 2/1983 | Scholze et al. ............... | 521/64 |

(Continued)

FOREIGN PATENT DOCUMENTS

JP    1-98640    4/1989

(Continued)

*Primary Examiner*—Philip C Tucker
*Assistant Examiner*—Sing P Chan
(74) *Attorney, Agent, or Firm*—Oblon, Spivak, Maier & Neustadt, L.L.P.

(57) ABSTRACT

There is provided a method for continuous production of a functional membrane whereby a functional membrane in which a functional polymer is filled into the micropores of a porous resin sheet can be obtained both continuously and efficiently.

The method for continuous production of a functional membrane of the present invention comprises a step for impregnating and depositing a polymer precursor having a functional group on a continuously conveyed porous resin sheet; a polymerization step for continuously feeding and bringing into contact first and second resin films to one side and the other side, respectively, of the precursor-impregnated/deposited sheet comprising the porous resin sheet into which the polymer precursor is impregnated and deposited, and polymerizing the polymer precursor in a state in which the sheet is sandwiched between the two resin films; a film peeling step; and a polymer removal step.

6 Claims, 2 Drawing Sheets

U.S. PATENT DOCUMENTS

| | | | | |
|---|---|---|---|---|
| 4,529,646 A * | 7/1985 | Sundet | ... | 428/315.5 |
| 4,604,204 A * | 8/1986 | Linder et al. | ... | 210/490 |
| 4,610,762 A * | 9/1986 | Birdwell | ... | 205/799 |
| 4,707,265 A * | 11/1987 | Barnes et al. | ... | 210/638 |
| 4,784,880 A * | 11/1988 | Coplan et al. | ... | 427/245 |
| 4,869,857 A * | 9/1989 | Itoh et al. | ... | 264/41 |
| 4,996,098 A * | 2/1991 | Perusich et al. | ... | 442/164 |
| 5,011,518 A * | 4/1991 | Ogawa | ... | 210/500.36 |
| 5,030,355 A * | 7/1991 | Schucker | ... | 210/640 |
| RE34,115 E * | 10/1992 | Coplan et al. | ... | 427/245 |
| 5,202,025 A * | 4/1993 | Onishi et al. | ... | 210/500.35 |
| 5,582,884 A * | 12/1996 | Ball et al. | ... | 428/341 |
| 5,935,440 A * | 8/1999 | Bratton et al. | ... | 210/500.25 |
| 5,976,434 A * | 11/1999 | Chung | ... | 264/45.6 |
| 6,015,495 A * | 1/2000 | Koo et al. | ... | 210/500.38 |
| 6,177,181 B1 * | 1/2001 | Hamada et al. | ... | 428/304.4 |
| 6,180,007 B1 * | 1/2001 | Gentile et al. | ... | 210/500.23 |
| 6,287,717 B1 * | 9/2001 | Cavalca et al. | ... | 429/40 |
| 6,354,443 B1 * | 3/2002 | Moya | ... | 210/490 |
| 6,375,876 B1 * | 4/2002 | Kessler et al. | ... | 264/41 |
| 6,468,657 B1 * | 10/2002 | Hou et al. | ... | 428/403 |
| 6,513,666 B2 * | 2/2003 | Meyering et al. | ... | 210/490 |
| 6,878,278 B2 * | 4/2005 | Mickols | ... | 210/500.38 |
| 7,259,208 B2 * | 8/2007 | Guerra et al. | ... | 525/178 |
| 7,338,692 B2 * | 3/2008 | Smith et al. | ... | 428/36.9 |
| 7,344,791 B1 * | 3/2008 | Yamaguchi et al. | ... | 429/30 |
| 2002/0137806 A1 * | 9/2002 | Stone et al. | ... | 521/27 |

FOREIGN PATENT DOCUMENTS

| | | |
|---|---|---|
| JP | 11-335473 | 12/1999 |
| JP | 2000-53788 | 2/2000 |
| JP | 2000-235849 | 8/2000 |
| JP | 2000-273229 | 10/2000 |
| JP | 2001-135328 | 5/2001 |
| JP | 2004-197062 | 7/2004 |

* cited by examiner

METHOD FOR CONTINUOUS PRODUCTION OF A FUNCTIONAL FILM

TECHNICAL FIELD

The present invention relates to a method for continuous production of a functional membrane. The present invention more particularly relates to a method for continuous production of a functional membrane capable of efficiently and continuously obtaining a functional membrane in which a functional polymer is filled into the micropores of a porous resin sheet.

The present invention can be utilized in fuel cells, redox flow cells, and other cells; various types of devices in electrolysis and the like; and in separation membranes and the like.

BACKGROUND ART

Functional membranes in which a polymer obtained by polymerizing monomers having an ion exchange group or various other functional polymer is filled into a porous membrane are used in many applications. For example, there is a fuel cell that is a type of electrochemical device based on an electrolyte membrane in which a polymer electrolyte is filled into a porous membrane. The performance of this fuel cell has been significantly enhanced in recent years by modifications and other improvements in the electrolyte membrane and catalyst technique, and development of such cells for use in low-emission vehicles and the like is progressing. This type of functional membrane is manufactured by impregnating a porous membrane with a functional monomer or the like, and then polymerizing the functional monomer. Methods are known whereby both sides of the porous membrane are covered with a polyester film as a release material during polymerization, and the membrane is heated under pressure in a nitrogen atmosphere (see Patent Document 1, for example).

Patent Document 1: JP-A-11-335473

DISCLOSURE OF THE INVENTION

Problems that the Invention is to Solve

Patent Document 1 describes sandwiching a porous membrane with two films as a release material during polymerization. However, this publication does not disclose a method for continuously and efficiently manufacturing a functional membrane in which a polymer is filled into the micropores of a porous resin sheet.

The present invention was developed in view of the foregoing background art, and an object of the present invention is to provide a method for continuous production of a functional membrane whereby a functional membrane having no defects such as areas in which the polymer filling is absent, particularly near the surface, is continuously and efficiently obtained by preventing loss and the like of the polymer precursor that is impregnated into and deposited on a continuously conveyed porous resin sheet.

Means for Solving the Problems

The present invention is as described below.

1. A method for continuous production of a functional membrane, characterized in comprising:

an impregnating/depositing step for continuously conveying a porous resin sheet and causing a polymer precursor containing a monomer having a functional group to be impregnated into and deposited on the porous resin sheet;

a polymerization step for continuously feeding and bringing into contact a first resin film to one side of the precursor-impregnated/deposited sheet comprising the porous resin sheet into which the polymer precursor is impregnated and deposited; continuously feeding and bringing into contact a second resin film to the other side of the precursor-impregnated/deposited sheet; and polymerizing the polymer precursor in a state in which the precursor-impregnated/deposited sheet is sandwiched between the first resin film and the second resin film to generate a polymer;

a film peeling step for peeling the first resin film and second resin film from the polymer-filled/deposited sheet in which the polymer is filled into and deposited on the porous resin sheet; and a polymer removal step for removing the polymer deposited on the surface of the polymer-filled/deposited sheet.

2. The method for continuous production of a functional membrane according to 1 above, wherein the functional group comprises at least one group selected from a sulfonic acid group and a phosphoric acid group.

3. The method for continuous production of a functional membrane according to 1 or 2 above, wherein at least one film selected from the first resin film and the second resin film is formed into a closed loop in the length direction and brought into contact with the precursor-impregnated/deposited sheet while rotating.

4. The method for continuous production of a functional membrane according to any one of 1 to 3 above, wherein at least one film selected from the first resin film and the second resin film is a resin film capable of transmitting an active energy beam, and the polymerization is performed by irradiation of an active energy beam from the resin film side capable of transmitting an active energy beam.

5. The method for continuous production of a functional membrane according to 4 above, wherein the first resin film and the second resin film have different thicknesses, the thin resin film is capable of transmitting an active energy beam, and the active energy beam is irradiated from the side of the thin film.

6. The method for continuous production of a functional membrane according to any one of 1 to 5 above, wherein at least the surface of the first resin film and the second resin film that makes contact with the precursor-impregnated/deposited sheet is treated with a mold release agent.

Effect of the Invention

By continuously feeding resin films to both sides of a porous resin sheet and polymerizing a polymer precursor in a state in which the porous resin sheet is sandwiched between the resin films in accordance with the method for continuous production of a functional membrane of the present invention, it is possible to continuously and efficiently obtain a functional membrane in which a functional polymer is filled into the micropores of a porous resin sheet and which has no defects such as areas in which the polymer filling is absent, particularly near the surface.

When the functional group is at least one group selected from a sulfonic acid group and a phosphoric acid group, an electrolyte membrane, which is a type of a functional membrane, can be efficiently manufactured.

Furthermore, when at least one film selected from the first resin film and the second resin film forms a closed loop in the length direction and comes into contact with the precursor-impregnated/deposited sheet while rotating, it is possible to efficiently manufacture a functional membrane that has no defects such as areas in which the polymer filling is absent.

When at least one film selected from the first resin film and the second resin film is a resin film capable of transmitting an active energy beam, and polymerization is performed by irradiation of an active energy beam from the resin film capable of transmitting an active energy beam, a high rate of polymerization is obtained and the method can be made suitable for continuous production.

The first resin film and the second resin film have different thicknesses, the thin resin film is capable of transmitting an active energy beam, and the active energy beam is irradiated from the side of the thin film. In this case, polymerization can be performed efficiently with a small amount of irradiation, and the precursor-impregnated/deposited sheet can be adequately supported by the thicker resin film.

When at least the surface of the first resin film and the second resin film that comes into contact with the precursor-impregnated/deposited sheet is treated with a mold release agent, the precursor-impregnated/deposited sheet can be smoothly conveyed, and a functional membrane can be more efficiently manufactured.

BEST MODE FOR CARRYING OUT THE INVENTION

The present invention will be described in detail hereinafter.

(1) Impregnation, Depositing Step

The "porous resin sheet" is continuously conveyed. A long sheet wrapped around a coiled core is usually used as the porous resin sheet, and this long sheet is continuously conveyed at a prescribed speed. The conveyance speed is not particularly limited, and may be 0.01 to 100 m/minute, but a speed of 1 to 50 m/minute is preferred.

Sheets composed of various types of resin may be used as the porous resin sheet. The resin used to form the porous resin sheet is not particularly limited, and examples of such resins include polyethylene, polypropylene, and other polyolefin-based resins; polyvinyl chloride, vinyl chloride-vinyl acetate copolymers, vinyl chloride-vinylidene chloride copolymers, vinyl chloride-olefin copolymers, and other vinyl chloride-based resins; polytetrafluoroethylene, polytrifluoroethylene, polychlorotrifluoroethylene, poly(tetrafluoroethylene-hexafluoropropylene), poly(tetrafluoroethylene-perfluoro-alkylether), and other fluorine-based resins; and nylon 6, nylon 66, and other polyamide resins, as well as aromatic polyimides, aramids, polysulfones, polyether ether ketones, and the like. The resin is preferably a polyolefin-based resin having excellent mechanical strength, chemical stability, chemical resistance, and other characteristics. It is also preferably to use a porous resin sheet that is cross-linked by electron beam irradiation, chemical cross-linking by a cross-linking agent, and the like, and that has enhanced heat resistance. A porous resin sheet is also preferred whose strength is increased by drawing and the like, and in which deformation by external force is minimized. A porous resin sheet that has a combination of cross-linking, drawing, and other treatments is more preferred.

The porosity of the porous resin sheet is dependent upon the type of polymer, the product in which the porous resin sheet is used, and other factors, but is preferably 5 to 95%. A porosity of 5 to 90% is particularly preferred, and 20 to 80% is more preferred. The preferred range for the average pore diameter varies according to the type of polymer, the product in which the porous resin sheet is used, and other factors, but is preferably 0.001 to 100 μm. An average pore diameter of 0.01 to 1 μm is particularly preferred. The porous resin sheet preferably has a porosity of 5 to 95%. A porosity of 5 to 90% is particularly preferred, and 20 to 80% is more preferred. An average pore diameter of 0.001 to 100 μm is preferred, and 0.01 to 1 μm is particularly preferred. When the porous resin sheet is used as an electrolyte membrane for a fuel cell, for example, the ratio of ion exchange groups per unit of surface area becomes insufficient and output decreases when the porosity is too small. Too high a porosity is also not preferred, because strength is reduced. The thickness of the porous resin sheet also varies according to the type of polymer, the product in which the porous resin sheet is used, and other factors, but is preferably 200 μm or less. A range of 1 to 150 μm, particularly 5 to 100 μm, and more particularly 5 to 50 μm, is preferred. A porous resin sheet that is too thin is not preferred, because strength is reduced, and when the sheet is used as an electrolyte membrane for a fuel cell, for example, the crossover quantity of hydrogen or methanol also increases. A thickness of more than 200 μm is unnecessary. An excessive thickness is not preferred in the case of a fuel cell, for example, because the membrane resistance becomes too high, and output is reduced.

The variation in thickness of the porous resin sheet is preferably ±5% or less, and more preferably ±1% or less.

The tensile modulus of this porous resin sheet is preferably 500 to 5,000 MPa, particularly 1,000 to 5,000 MPa. The tensile strength at break of the porous resin sheet is preferably 50 to 500 MPa, particularly 100 to 500 MPa. It is more preferred that the porous resin sheet have a tensile modulus of 500 to 5,000 MPa, particularly 1,000 to 5,000 MPa, and a tensile strength at break of 50 to 500 MPa, particularly 100 to 500 MPa. When the porous resin sheet has at least one characteristic selected from a tensile modulus of 500 to 5,000 MPa and a tensile strength at break of 50 to 500 MPa, the sheet has appropriate rigidity, and when the functional membrane is used as the electrolyte membrane of a fuel cell, for example, cracks are not caused in the membrane by compression molding during electrode joining, constriction during fuel cell assembly, and other procedures. The temperature of a fuel cell increases during operation, but it is preferable to use a porous resin sheet that has adequate heat resistance at this temperature, and that is not easily deformed by the application of external force.

The "polymer precursor" contains monomers having a functional group. The "monomer having a functional group" (hereinafter referred to as "functional monomer") may be of various types according to the purpose, application, and other attributes of the functional membrane. Examples of this functional monomer include monomers having an ion exchange group used when the functional membrane is used as the electrolyte membrane in a fuel cell, in electrolysis, or in other applications; and monomers having a polar group or nonpolar group used when the functional membrane is a separation membrane used in concentration and other processes.

The monomer that has an ion exchange group and is used when the functional membrane is an electrolyte membrane in a fuel cell or the like is preferably a monomer that has a protonic acid-based group and delivers excellent performance when used as an electrolyte membrane for a fuel cell. The monomer that has a protonic acid-based group is a compound having a polymerizable functional group and protonic acid in its molecule, and examples of such monomers include 2-(meth)acrylamido-2-methylpropane sulfonic acid, styrene sulfonic acid, (meth)acrylsulfonic acid, vinyl sulfonic acid, isoprene sulfonic acid, (meth)acrylic acid, maleic acid, crotonic acid, vinyl phosphonic acid, and acidic (meth)acrylates containing a phosphoric acid group. These functional monomers may be used singly or in combinations of two or more types of monomers. The term "(meth)acrylic" means "acrylic and/or methacrylic;" the term "(meth)allylic" means "allylic and/or methallylic;" and the term "(meth)acrylate" means "acrylate and/or methacrylate" (these meanings also apply hereinafter).

Monomers having a functional group that can be substituted with an ion exchange group may also be used. Examples of such monomers include salts, anhydrides, and esters of the abovementioned compounds. When the acid residual group of the monomer that is used is a salt, anhydride, ester, or other derivative, proton conductivity can be imparted to the monomer by conversion to a protonic acid type after polymerization. Monomers having a site to which an ion exchange group can be introduced after polymerization may also be used. These monomers include styrene, α-methyl styrene, chloromethyl styrene, t-butyl styrene, and other monomers having a benzene ring. Methods for introducing an ion exchange group into these monomers include a method for performing sulfonation using chlorosulfonic acid, concentrated sulfuric acid, sulfur trioxide, or another sulfonating agent; and other methods. These monomers may be used singly or in combinations of two or more types of monomers.

The highly proton-conductive vinyl compounds that have a sulfonic acid group and vinyl compounds that have a phosphoric acid group are preferred as the monomers having a protonic acid-based group, and highly polymerizable 2-(meth)acrylamido-2-methylpropane sulfonic acid is particularly preferred.

Monomers that have an ion exchange group and can be used when the functional membrane is the electrolyte membrane in electrolysis or the like include 2-(meth)acrylamido-2-methylpropane sulfonic acid, styrene sulfonic acid, (meth)acryl sulfonate, vinyl sulfonate, maleic acid, crotonic acid, and other monomers having a protonic acid-based group; and vinyl pyridine, p-vinyl-N,N-dimethylbenzylamine, and other basic monomers. These monomers may be used singly or in combinations of two or more types of monomers. Monomers that have a polar group or non-polar group and are used when the functional membrane is a separation membrane used in concentration or other processes include (meth)acrylic acid, maleic acid, crotonic acid, and other unsaturated organic acids or esters; amides, imides, salts, and other derivatives; methyl(meth)acrylate, ethyl(meth)acrylate, propyl(meth)acrylate, butyl(meth)acrylate, pentyl(meth)acrylate, cyclohexyl(meth)acrylate, lauryl(meth)acrylate, benzyl(meth)acrylate, isobornyl(meth)acrylate, and other (meth)acrylic acid esters; and styrenes, α-methyl styrenes, N-vinyl pyrrolidones, and vinyl pyridines. These monomers may be used singly or in combinations of two or more types of monomers. When two or more types of monomers are used, various combinations may be used according to the degree of affinity to the separation target.

The polymer precursor may be composed solely of a functional monomer, or may contain a functional monomer and another monomer copolymerizable with this functional monomer (hereinafter referred to as "another monomer"). Furthermore, the polymer precursor may contain a functional monomer and a cross-linkable monomer, and may contain a functional monomer, another monomer, and a cross-linkable monomer.

When the functional monomer is a monomer that has an ion exchange group and is used to form the electrolyte membrane in a fuel cell or the like, a monomer that does not have a protonic acid-based group may be added as the abovementioned other monomer. The other monomer is not particularly limited insofar as it is a monomer or the like that can be copolymerized with a monomer having an ion exchange group, a cross-linkable monomer, or the like, and may include (meth)acrylic acid esters, (meth)acrylamides, maleimides, styrenes, organic acid vinyls, allyl compounds, methallyl compounds, and the like. These monomers may be used singly or in combinations of two or more types of monomers.

When the functional monomer is a monomer having an ion exchange group that is used to form the electrolyte membrane in electrolysis or the like, a monomer that does not have an ion exchange group, a cross-linkable monomer, or the like may be added as the other monomer in order to enhance strength, adjust hydrophilicity, or the like. These monomers may be used singly or in combinations of two or more types of monomers. When the functional monomer is a monomer that has a polar group or non-polar group and used to form the separation membrane used in concentration or other processes, a cross-linkable monomer may be added as the other monomer in order to enhance strength or the like. These monomers may be used singly or in combinations of two or more types of monomers.

A monomer having two or more polymerizable functional groups in its molecule may be used as the cross-linkable monomer. Examples of this cross-linkable monomer include N,N'-methylene bis(meth)acrylamide, polyethylene glycol di(meth)acrylate, polypropylene glycol di(meth)acrylate, trimethylol propane diallyl ether, pentaerythritol triallyl ether, divinyl benzene, bisphenol di(meth)acrylate, isocyanuric acid di(meth)acrylate, tetraallyl oxyethane, triallylamine, and diallyl oxyacetate. The cross-linkable monomer is not limited to having a carbon-carbon double bond, and although the reaction rate of such compounds is somewhat low, an epoxy compound having two or more functional groups may be used. When this epoxy compound is used, a cross-linked bond is formed by reaction with a polymer carboxyl group or the like. These cross-linkable monomers may be used singly or in combinations of two or more types of monomers.

Polymerization initiators, antioxidants, UV absorbers, colorants, and various components other than the polymer precursor may also be impregnated into and deposited on the porous resin sheet as needed.

Impregnation and deposition of the polymer precursor or the like may be performed by impregnating the polymer precursor or the like into the micropores of a long porous resin sheet conveyed continuously, and depositing the polymer precursor or the like to the surface of the porous resin sheet. The method of this impregnation and deposition is not particularly limited, and includes a method whereby the porous resin sheet is dipped in the polymer precursor or other compound, in a solution or liquid dispersion in which the polymer precursor or other compound is dissolved or dispersed in a solvent, or the like; a method whereby the polymer precursor or other compound, a solution or liquid dispersion in which the polymer precursor or other compound is dissolved or dispersed in a solvent, or the like is sprayed onto the porous resin sheet; and other methods. A method whereby the porous resin sheet is dipped in the polymer precursor or other compound, in a solution or liquid dispersion in which the polymer precursor or the like is dissolved or dispersed in a solvent, or the like is preferred as the impregnation and deposition method. The polymer precursor or other compound can be more uniformly impregnated into and deposited on the porous resin sheet by this method. It is particularly preferred that the polymer precursor or other compound be uniformly impregnated into the micropores of the porous resin sheet. In order to achieve this, it is preferred that a method be selected whereby impregnation is performed while taking into account the porosity of the porous resin sheet, the average pore diameter of the micropores, the viscosity of the polymer precursor or other compound, or a solution of this precursor or other compound, and that the impregnation conditions and the like be set.

The temperature, time, and other conditions during this impregnation and deposition are not particularly limited, but a temperature of 0 to 120° C., particularly 5 to 80° C., and more particularly 5 to 50° C. is preferred. A time of 0.1 second to 1 hour, particularly 1 second to 10 minutes, and more particularly 1 second to 5 minutes, is preferred. It is more preferred that the temperature be 0 to 120° C., particularly 5 to 80° C., and more particularly 5 to 50° C., and that the time be 0.1 second to 1 hour, particularly 1 second to 10 minutes, and more particularly 1 second to 5 minutes.

When each component of the polymer precursor or the like is itself a liquid, particularly a liquid having a low enough viscosity to enable impregnation, the polymer precursor may be impregnated and deposited without modification. The preferred viscosity in this case is 1 to 10,000 mPa·s. Furthermore, when the precursor cannot be impregnated and deposited without modification, a solution or liquid dispersion in which each component of the polymer precursor or the like is dissolved or dispersed may also be impregnated and deposited. The viscosity of this solution or dispersion is also preferably 1 to 10,000 mPa·s.

When a polymerization initiator and various other components are used, these components may each be impregnated and deposited separately from the polymer precursor. The polymer precursor may also be mixed with at least one type of compound selected from among the polymerization initiator and other various components, and may be simultaneously impregnated and deposited. It is also possible for the polymerization initiator and other various components to all be mixed with the polymer precursor and simultaneously impregnated and deposited.

When impregnation and deposition are performed using a solution or liquid dispersion, these may each be impregnated and deposited as a solution or liquid dispersion that is separate from the polymer precursor. Each component may be simultaneously impregnated and deposited using a solution or liquid dispersion containing the polymer precursor and at least one type among the polymerization initiator and other various components. Each component may also be simultaneously impregnated and deposited using a solution or liquid dispersion containing the polymer precursor and all of the components that include the polymerization initiator and other various components.

When the polymer precursor and at least one type of compound selected from among the polymerization initiator and other various components, preferably all of the components including the polymerization initiator and the like, are simultaneously impregnated and deposited, each component can be more uniformly impregnated into the micropores of the porous resin sheet.

(2) Polymerization Step

The polymer precursor can be polymerized by irradiation with ultraviolet rays, electron beams, visible light rays, or other active energy rays, thermal polymerization by heating, and other methods. This polymerization is performed in a state in which the abovementioned "first resin film" is continuously fed to and brought into contact with one side of the abovementioned "precursor-impregnated/deposited sheet" in which the polymer precursor or the like is impregnated and deposited, the abovementioned "second resin film" is continuously fed to and brought into contact with the other side of the sheet, and the precursor-impregnated/deposited sheet is sandwiched between the first resin film and the second resin film. This state of contact is not particularly limited insofar as the porous resin sheet and the like can be smoothly conveyed at a prescribed speed, and the impregnated polymer precursor does not drop out prior to polymerization. If the polymer precursor or the like can thus be prevented from dropping out, the polymer can be thoroughly filled into the micropores from the surface to the inside of the sheet, and a functional membrane can be obtained that is free of defects. It is preferred that the first and second resin films and the precursor-impregnated/deposited sheet be sealed against penetration by air and other gases at their respective interfaces. If penetration by air and the like can thus be prevented, a functional membrane can be more efficiently manufactured without polymerization being inhibited, particularly when a radical polymerizable polymer precursor is used.

The first resin film 21 and the second resin film 22 may be continuously delivered and fed from film feeding sources 211 and 221, respectively, and brought into contact with the precursor-impregnated/deposited sheet (see FIG. 2). A long film wound onto a coiled core is usually used as the film feeding source, and the first and second resin films delivered and fed from the film feeding source are each brought into contact with one side and the other side, respectively, of the precursor-impregnated/deposited sheet 11, and the precursor-impregnated/deposited sheet is held between two sheets of resin film and conveyed. The polymer precursor can be polymerized by irradiation of ultraviolet rays, electron beams, or other active energy rays from at least one side of the resin film. Each resin film and precursor-impregnated/deposited sheet thus conveyed may be heated and the polymer precursor heat-polymerized. In FIG. 2, the precursor-impregnated/deposited sheet or the like is conveyed in the horizontal direction, but this conveyance direction may be tilted, or conveyance may be performed in the orthogonal direction. The precursor-impregnated/deposited sheet and the like may also be conveyed from bottom to top or from top to bottom.

After polymerization, the first and second resin films may each be peeled from the precursor-impregnated/deposited sheet, wound around a coiled core, and stored. Each resin film wrapped around a coiled core may be reused until rendered unusable by contamination, wrinkling, stretching, or the like.

It is also possible for the first resin film 21 to be continuously delivered and fed from the film feeding source 211 and brought into contact with the precursor-impregnated/deposited sheet 11, for the second resin film 22 to be caused to form a closed loop in the length direction, and for this film to be brought into continuous contact with the precursor-impregnated/deposited sheet while being rotated (see FIG. 3). The film feeding source 211 used is the same as the one described above, and the first resin film delivered and fed from this film feeding source is conveyed together with the precursor-impregnated/deposited sheet while in contact with one side of the precursor-impregnated/deposited sheet. The rotating second resin film is brought into continuous contact with the other side of the precursor-impregnated/deposited sheet, and the precursor-impregnated/deposited sheet is sandwiched between two resin films and conveyed. The polymer precursor may be irradiated with active energy rays in the same manner as described above and polymerized, or may be heated and polymerized. In FIG. 3, the precursor-impregnated/deposited sheet and other components are conveyed in the horizontal direction, but this conveyance direction may be tilted, or conveyance may be performed in the orthogonal direction. Conveyance may also be performed from bottom to top or from top to bottom.

After polymerization, the first resin film may be peeled from the precursor-impregnated/deposited sheet, wound around a coiled core, and stored. The resin film wrapped around a coiled core may be reused until rendered unusable by contamination, wrinkling, stretching, or the like. The second resin film may be continuously used until rendered unusable by contamination, wrinkling, stretching, or the like.

It is also possible for the first resin film 21 and the second resin film 22 to each be caused to form a closed loop in the length direction, for these films facing each other at prescribed intervals to each be rotated, for the precursor-impregnated/deposited sheet 11 conveyed between these films to be brought into continuous contact with both the first and second resin films, and for the precursor-impregnated/deposited sheet to be sandwiched between two resin films and conveyed (see FIG. 4). The polymer precursor may be irradiated with active energy rays in the same manner as described above and polymerized, or may be heated and polymerized. In FIG. 4, the precursor-impregnated/deposited sheet and other components are conveyed in the horizontal direction, but this conveyance direction may be tilted, or conveyance may be performed in the orthogonal direction. Conveyance may also be performed from bottom to top or from top to bottom.

The first resin film and second resin film may be repeatedly used until rendered unusable by contamination, wrinkling, stretching, or the like.

In FIGS. 2 through 4, the arrows on the left side of each drawing indicate the direction in which the product is conveyed to the polymer removal step, which is the subsequent step.

The oxygen permeability of the first resin film and second resin film is preferably low so as to cause polymerization of the polymer precursor impregnated into and deposited onto the precursor-impregnated/deposited sheet sandwiched between the films to progress smoothly. The oxygen permeability of these films at 25° C. as measured according to ASTM D 1434-72, is preferably 5,000 mL/m$^2$·24 hours·MPa or lower, particularly 3,000 mL/m$^2$·24 hours·MPa or lower, and more particularly 1,500 mL/m$^2$·24 hours·MPa.

The resin for forming each of the first resin film and the second resin film is not particularly limited. The first resin film and the second resin film may be composed of the same type of resin, or may be composed of different types of resins. The resin may be a thermoplastic resin or a heat-curable resin, but a thermoplastic resin whereby a high-strength film can easily be formed is preferred. Examples of this thermoplastic resin include polyethylene terephthalate, polybutylene terephthalate, and other polyesters (770, for example); polyethylene (81,000, for example), polypropylene (16,200, for example), and other polyolefins; and nylon 6, nylon 66, and other polyamides (200, for example), as well as polyvinyl chloride (1,400, for example), polyvinylidene chloride (300, for example), regenerated cellulose (60, for example), polycarbonate (36,500, for example), and polyphenylene sulfide (2,070, for example). (The numbers in parentheses are the oxygen permeability of each resin at 25° C. as measured by the method described above. The thickness of the film used in the measurement is 25 μm, and the units are mL/m$^2$·24 hours·MPa.) Polyesters, polyolefins, and polyvinylidene chlorides are preferred among these thermoplastic resins. These compounds are not easily deformed when made into a film, and are not easily altered by the impregnated and deposited compounds or other components; by irradiation with ultraviolet rays, electron beams, and other active energy rays; by heating during thermal polymerization; and other factors. When a film composed of a polyester and a polyolefin is polymerized by irradiation with active energy rays, such a film is also preferred for its ease of transmitting active energy rays. Polypropylene is more preferred as a polyolefin.

Resins of the same type are composed of monomers in which the main repeating units constituting the molecule are the same (for example, when the total quantity of repeating units is 100 mol %, the quantity of the main repeating units is 80 mol % or higher), and may have small quantities of repeating units composed of other monomers. The resins may have different molecular weights, degrees of crystallinity, and other characteristics.

When polymerization is performed by irradiation with active energy rays, the first resin film and second resin film are preferably films that transmit active energy rays; specifically, that are transparent with respect to active energy rays. The active energy transmittance [(Amount of radiation after transmitting through the film/Amount of radiation irradiated to the film)×100(%)] is preferably 5% or higher, and particularly 30% or higher. When ultraviolet rays and visible light rays are used, the film is preferably colorless and transparent, and may be colored and transparent. However, the film is preferably transparent or at least highly transparent in the wavelength region in which the polymerization initiation effects of the polymerization initiator are demonstrated. The film may be visually opaque when electron beams are used, but is preferably either transparent or at least highly transparent so that the appearance and the like can be confirmed through the film during polymerization and at other times.

The thicknesses of the first resin film and the second resin film are not particularly limited. The first resin film and the second resin film may each have the same thickness, or may each have different thicknesses. The thicknesses of the first and second resin films are preferably 3 to 100 μm, particularly 5 to 80 μm, and more particularly 7 to 60 μm. A thickness of less than 3 μm in each of the films is not preferred, because wrinkling can easily occur, and it can be impossible to adequately support the precursor-impregnated/deposited sheet during polymerization. A thickness of more than 100 μm is also not preferred, because the amount of active energy rays absorbed into the film increases when active energy rays are used in polymerization.

When active energy rays are used in polymerization, it is preferred that the first resin film and the second resin film each have different thicknesses, whereby one film is thin, and the other is thick. By having different thicknesses in this manner, and irradiating the active energy rays from the side of the thin resin film, the amount of active energy rays absorbed by the resin film can be reduced, and adequate polymerization can be obtained using a small amount of active energy rays. The precursor-impregnated/deposited sheet can also be supported by the thick resin film. The thickness of the thin resin film is preferably $1/10$ to $1/2$, particularly $1/8$ to $1/3$, and more particularly $1/6$ to $1/4$ the thickness of the thick resin film. The thickness of the thin resin film is preferably 3 to 30 μm, particularly 5 to 20 μm, and more particularly 7 to 15 μm. When the thickness of the thin resin film is 3 to 30 μm, the polymer precursor can be polymerized with good efficiency. The thickness of the thick resin film is preferably 35 to 80 μm, particularly 40 to 65 μm, and more particularly 45 to 55 μm. When the thickness of the thick resin film is 35 to 80 μm, the precursor-impregnated/deposited sheet can be reliably supported.

The variance in the thicknesses of the first resin film and the second resin film is preferably ±10% or less, and more preferably ±2% or less.

If the first and second resin films can be easily peeled from the polymer-filled/deposited sheet after polymerization of the polymer precursor, the first and second resin films can be brought into contact with the precursor-impregnated/deposited sheet without treatment. However, at least the film surface that comes into contact with the precursor-impregnated/deposited sheet may be treated by application of a mold release agent. Silicone-based mold release agents, fluorine-based mold release agents, higher fatty acid-based mold release agents, and various other mold release agents may be used as the mold release agent. By treating with a mold release agent in this manner, the first and second resin films and the polymer-filled/deposited sheet can be rapidly peeled from each other, and the precursor-impregnated/deposited sheet and other components can be smoothly conveyed after polymerization.

The method for polymerizing the polymer precursor impregnated into and deposited onto the precursor-impregnated/deposited sheet is not particularly limited, and may include polymerization by irradiation with ultraviolet rays, electron beams, visible light rays, and other active energy rays, thermal polymerization by heating, and the like as previously mentioned. Polymerization by irradiation with active energy rays is preferred among these methods, and a functional membrane can be continuously produced both easily and efficiently by this method. Ultraviolet rays and electron beams are more preferred as the active energy rays. When ultraviolet rays are used, the apparatus is simple compared to the one used with electron beams, and the cost of irradiation is also lower. When electron beams are used, the ease of bond formation with the porous resin sheet is preferred. Electron beams also have excellent transmission properties with respect to the porous resin sheet. Particularly when the porous resin sheet is composed of a hydrocarbon-based polymer, a cross-linked structure can be Introduced into the polymer according to the irradiation conditions. Polymerization using electron beam irradiation is also preferred in that radical photopolymerization initiators and the like are not needed.

When the polymer precursor is irradiated with ultraviolet rays and polymerized, a radical photopolymerization initiator for generating a radical by using ultraviolet rays is preferably deposited in advance on the surfaces of the micropores of the porous resin sheet. The method for depositing the radical photopolymerization initiator is not particularly limited, but this deposition is preferably performed by impregnating a solution or liquid dispersion containing this initiator into the micropores of the porous resin sheet, and then removing the solvent. The initiator can be uniformly deposited in the micropores of the porous resin sheet by such a method.

The radical photopolymerization initiator is not particularly limited, but is preferably a radical polymerization initiator that based on benzophenone, thioxanthone, thioacridone, or another aromatic ketone and is capable of generating a radical by removing a hydrogen atom from a carbon-hydrogen bond.

Benzophenone-based initiators include o-benzoyl methyl benzoate, 4-phenylbenzophenone, 4-benzoyl-4'-methyl-diphenylsulfide, 3,3',4,4'-tetra(t-butylperoxycarbonyl) benzophenone, 2,4,6-trimethylbenzophenone, 4-benzoyl-N,N-dimethyl-N-[2-(1-oxy-2-propenyloxy)ethyl]benzene methanaminium bromide, (4-benzoylbenzyl)trimethylammonium chloride, 4,4'-dimethylamino benzophenone, 4,4'-diethylamino benzophenone, and the like. Thioxanthone-based initiators include thioxanthone, 2-chlorothioxanthone, 2,4-diethylthioxanthone, 2-ethylthioxanthone, and the like. Thioacridone-based initiators include thioacridone and the like.

An initiator based on benzoin, acetophenone, benzyl, or the like may be used as the radical photopolymerization initiator.

Benzoin-based initiators include benzoins, benzoin methyl ethers, benzoin isopropyl ethers, benzoin ethyl ethers, benzoin isobutyl ethers, and the like. Acetophenone-based initiators include acetophenone, propiophenone, diethoxyacetophenone, 2,2-dimethoxy-1,2-diphenyl ethane-1-one, 1-hydroxycyclohexyl phenyl ketone, 2-methyl-1-(4-(methylthio)phenyl)-2-monpholinopropane -1,2-benzyl-2-dimethylamino-1-(4-morpholinophenyl) butanone-1,2-hydroxy-2-methyl-1-phenylpropane-1-one, 1-(4-(2-hydroxyethoxy)-phenyl)-2-hydroxy -di-2-methyl-1-propane-1-one, and the like. Benzyl-based initiators include benzyls and the like.

These radical photopolymerization initiators may be used singly or in combinations of two or more types of initiators.

The radical photopolymerization initiator is preferably used in the form of a solution or liquid dispersion as described above. The concentration of the initiator in this solution or liquid dispersion is preferably 0.01 to 10 weighty, particularly 0.1 to 5 weight %. Polymerization can be inadequate when this concentration is less than 0.01 weight %. When this concentration exceeds 10 weight %. crystals of the initiator may precipitate and partially block the micropores of the porous resin sheet. Filling of the polymer precursor and other components may be inadequate when the micropores are partially blocked in this manner. Filling may also be uneven across the entire porous resin sheet, which is undesirable in any case.

When the polymer precursor is irradiated with electron beams and polymerized, the acceleration voltage of the irradiated electron beams varies according to the type of polymer precursor and other factors, but is preferably 150 to 500 KeV, particularly 150 to 200 KeV. Electron beams are difficult to generate when the acceleration voltage is too low, and when the acceleration voltage is too high, the porous resin sheet deteriorates, and the sheet strength can be reduced. The amount of irradiation also varies according to the type of polymer precursor, but is preferably 10 to 10,000 mJ/cm$^2$, particularly 100 to 5,000 mJ/cm$^2$, and more particularly 200 to 2,000 mJ/cm$^2$. Irradiation at less than 10 mJ/cm$^2$ is not preferred, because adequate polymerization is not obtained, and irradiation at more than 10,000 mJ/cm$^2$ is also not preferred because the porous resin sheet deteriorates and the sheet strength can be reduced.

After irradiation with electron beams and polymerization, post-curing can be performed as needed by irradiation with ultraviolet rays, heating, or another method. A polymerization initiator for that purpose may also be added to the polymer precursor in advance. Examples of this polymerization initiator include 2,2'-azo bis(2-amidinopropane)dihydrochloride and other azo compounds; ammonium persulfate, potassium persulfate, sodium persulfate, hydrogen peroxide, benzoyl peroxide, cumene hydroperoxide, di-t-butyl peroxide, and other peroxides; redox initiators in which the above-mentioned peroxides are combined with sulfites, bisulfites, thiosulfates, formamidinesulfinic acid, ascorbic acid, and other reducing agents; 2,2'-azo bis-(2-amidinopropane)dihydrochloride, azobiscyanovaleric acid, and other azo-based radical polymerization initiators; and the like. These polymerization initiators may be used singly or in combinations of two or more types of initiators.

The post-curing method preferably involves performing curing by irradiation with ultraviolet rays whereby the desired functional membrane is obtained with good productivity by a simple process in which the polymerization reaction is easily controlled. When post-curing is performed by irradiation with ultraviolet rays, the radical photopolymerization initiator is more preferably dissolved or dispersed in advance in the solution or liquid dispersion containing the monomer precursor. The aforementioned compounds and the like may be used as the radical photopolymerization initiator. Furthermore, the quantity in which this radical photopolymerization initiator is added with respect to 100 weight % of the polymer precursor is preferably 0.001 to 1 weight %, particularly 0.001 to 0.5 weight %, and more particularly 0.01 to 0.5 weight %.

During post-curing, the first resin film and the second resin film may be brought into contact with the precursor-impregnated/deposited sheet without modification. At least one film selected from the first resin film and the second resin film may be peeled off when polymerization has progressed to the extent that the polymer precursor is adequately retained in the micropores of the porous resin sheet. When ultraviolet rays or other active energy rays are irradiated from the side on which the resin film is peeled, the irradiation efficiency can be enhanced, and post-curing can be performed with good efficiency. As the resin film is peeled, the excess polymer precursor deposited on the surface of the porous resin sheet comes into contact with the air, polymerization is inhibited, and the polymer deposited on the surface of the polymer-filled/deposited sheet can be more easily removed in the subsequent polymer removal step.

(3) Polymer Removal Step

The polymer deposited on the surface of the abovementioned "polymer-filled/deposited sheet" can be removed by scraping with a plastic blade or other tool composed of polypropylene or the like, or by another method. This removal may also be performed by bringing a deposited polymer removal tool into contact with the polymer-filled/deposited sheet. This deposited polymer removal tool may be any tool that does not harm the functional membrane or cause deformation or other damage to occur in the functional membrane. This deposited polymer removal tool may include a brush roll, a rubber blade, or the like. The polymer deposited on the surface of the polymer-filled/deposited sheet may also be removed by passing the sheet through a narrow gap slightly wider than the thickness of the sheet.

The impregnation and deposition step, the polymerization step, the film peeling step, and the polymer removal step are performed in sequence. In this continuous manufacturing method, a long porous resin sheet is continuously conveyed, the polymer precursor or the like is impregnated and deposited, and a precursor-impregnated/deposited sheet is formed, after which a first resin film and a second resin film are continuously fed and brought into contact with one side and the other side, respectively, of the precursor-impregnated/deposited sheet. With the precursor-impregnated/deposited sheet sandwiched in this manner between the first and second resin films, the polymer precursor is polymerized, a polymer-filled/deposited sheet is formed, the first and second resin films are then peeled from this polymer-filled/deposited sheet, and the polymer deposited on the surface of the polymer-filled/deposited sheet is removed. This sequence of operations is thus performed in consecutive steps. The resultant long functional membrane may be stored as a product by continuously wrapping it around a coiled core, or by another method. In order to efficiently manufacture the functional membrane, other steps are also performed in sequence when such other steps are used.

This continuous manufacturing method may be performed using such steps as those shown in FIG. 1, for example. Specifically, efficient manufacturing can be performed by a process in which the continuously conveyed long porous resin sheet 1 is brought into contact with a solution or liquid dispersion 3 containing a polymer precursor or the like in a container (impregnation and deposition step); the first resin film 21 and second resin film 22 continuously fed from the resin film feeding sources 211 and 221 are brought into contact with the precursor-impregnated/deposited sheet 11 into which the polymer precursor or the like is impregnated and deposited, the precursor-impregnated/deposited sheet is conveyed while being sandwiched between the two resin films and is irradiated with electron beams, ultraviolet rays, or the like from an active energy radiation source E, and the polymer precursor is polymerized (polymerization step); the first and second resin films are then peeled from the polymer-filled/deposited sheet in which the polymer is filled into and deposited on the porous resin sheet (film peeling step); the polymer deposited on the surface of the polymer-filled/deposited sheet 12 is scraped off by a plastic blade 4 and removed (polymer removal step); and the scraped polymer is rinsed off by water sprayed from a nozzle N, after which the product is dried using a drying apparatus H as needed, and the resulting functional membrane 5 is continuously wound onto a coiled core. In order to protect the manufactured product, the product may be wound while being laminated with a protective film 6 composed of a polyester, polyolefin, fluororesin, or the like on at least one side (both sides in FIG. 1) of the wound functional membrane.

Steps other than the impregnation and deposition step, the polymerization step, the film peeling step, and the polymer removal step may include a drying step after the polymer removal step, an inspection step after the drying step, a humidification step, or other steps. These other steps are also executed as a continuous sequence of steps together with the impregnation and deposition step, the polymerization step, the film peeling step, and the polymer removal step.

When the functional membrane manufactured by the method of the present invention is an electrolyte membrane, this electrolyte membrane is useful as an electrolyte membrane in a solid polymer fuel cell, particularly a direct methanol fuel cell. Thus, when the electrolyte membrane is used in a fuel cell in this manner, the electrolyte membrane is sandwiched between two electrodes provided with a platinum or other catalyst, an electrolyte membrane electrode assembly is then integrated using a heat press or the like, and this assembly can be installed and used in a fuel cell.

EXAMPLES

Example 1

Using 90 weight parts of 2-acrylamido-2-methylpropane sulfonic acid and 10 weight parts of N,N'-methylene bisacrylamide as polymer precursors, these polymer precursors, 2 weight parts of an ultraviolet polymerization initiator (product name: "Dalocure 1173," manufactured by Chiba Specialty Chemicals), and 2 weight parts of a surfactant were dissolved in 100 weight parts of water to prepare a solution. Then, as shown in FIG. 1, a polyethylene porous resin sheet 1 was continuously conveyed and passed through a container containing the abovementioned solution 3, the porous resin sheet was impregnated with the polymer precursor and the like, and a precursor-impregnated/deposited sheet 11 was fabricated. Then, as shown in FIG. 2, a polyethylene terephthalate film (having an oxygen permeability of 385 mL/m$^2$·24 hours·MPa at 25° C. as measured in accordance with ASTM D 1434-72) having a thickness of 50 μm was brought into contact with both sides of the precursor-impregnated/deposited sheet, the precursor-impregnated/deposited sheet was conveyed while sandwiched between these films, and irradiated with ultraviolet rays from both sides by a high-pressure mercury lamp as a source E of active energy rays so that the total quantity of ultraviolet radiation after transmitting through the film was 2,000 mJ/cm$^2$, and the polymer precursor was polymerized. The polyethylene terephthalate films were then peeled from both sides, and the polymer deposited on the surface of the polymer-filled/deposited sheet was then removed using a blade made of polypropylene. The electrolyte membrane thus obtained was semi-transparent, and the membrane surface was devoid of scratches, deformation, tearing, or other damage.

Example 2

One of the polyethylene terephthalate films was given a thickness of 10 μm, and irradiation with ultraviolet rays was performed only from the side of this thin film. An electrolyte membrane was manufactured by the same method as in Example 1, except that the amount of irradiation was set so that the dose of ultraviolet rays after transmitting through the film was 2,000 mJ/cm². The electrolyte membrane thus obtained was semi-transparent, and the membrane surface was devoid of scratches, deformation, tearing, or other damage. Since the thickness of the film through which the ultraviolet rays were transmitted in this Example 2 was ⅕ that of the film in Example 1, it was possible to reduce the amount of ultraviolet radiation prior to transmitted through the film by half.

Comparative Example 1

An electrolyte membrane was manufactured by the same method as in Example 1, except that a polyethylene terephthalate film was not brought into contact with the membrane. The resulting electrolyte membrane had defective areas in which the polymer was not filled, and was an uneven membrane. Consequently, the product could not be evaluated as an electrolyte membrane as described hereinafter.

Reference Example 1

The solution prepared in Example 1 in an amount of 50 mL was placed in a Petri dish, a 5 cm square sample cut from a polyethylene porous resin sheet was soaked in the solution and impregnated with the polymer precursor and the like, and the sample taken out from the solution was then held between glass plates and irradiated from one side with ultraviolet rays from an experimental high-pressure mercury lamp so that the quantity of ultraviolet radiation after transmitting through the glass was 1,000 mJ/cm². The sample was then turned over and irradiated from the opposite side with the same dose of ultraviolet rays. The glass plate was then removed, the polymer deposited on the surface was removed using a polypropylene blade, and an electrolyte membrane was obtained. This electrolyte membrane was semi-transparent, and the membrane surface was devoid of scratches, deformation, tearing, or other damage.

The proton conductivity and methanol permeation flux of each electrolyte membrane obtained in Examples 1 and 2 and Reference Example 1 were measured according to the methods described below. The results are shown in Table 1.

(1) Measurement of Proton Conductivity

The electrolyte membrane was soaked and allowed to swell in water at 25° C., the electrolyte membrane was then sandwiched between two platinum foil electrodes, and a sample was created for measuring proton conductivity. Using this sample, the impedance was measured using an impedance meter (model "HP4192A," manufactured by Hewlett Packard).

(2) Measurement of Methanol Permeation Flux

Using a methanol/water solution in a 1/9 weight ratio as a feeding solution and reducing the pressure on the permeation side, a pervaporation test was performed at 50° C. until the permeation flow rate became constant. The details of the test are described below.

The electrolyte membrane was held in a stainless steel cell, the abovementioned feeding solution was placed on the top of the electrolyte membrane, and the solution was stirred. A heater and a resistance temperature sensor were placed in the feeding solution, and the temperature was brought to 50° C. A vacuum pump was also connected via a cold trap to the bottom surface of the electrolyte membrane. With the bottom surface of the electrolyte membrane, that is, the permeation side, depressurized in this manner, a mixture of methanol and water vapor that passed through the electrolyte membrane was collected in the cold trap. The vapor (solidified in the cold trap) thus collected was then heated, dissolved, and taken out as a liquid, the total transmitted flux was measured from the weight of the liquid, and the composition of the permeated vapor was measured by gas chromatography. This measurement was continued until the membrane permeability became constant over time, and the value measured when the permeability became constant was evaluated as the steady-state permeability.

TABLE 1

|  | PROTON CONDUCTIVITY (S/cm²) | METHANOL PERMEATION FLUX (kg/m²·h) | APPEARANCE |
|---|---|---|---|
| Example     1 | 53 | 0.72 | GOOD |
|                    2 | 54 | 0.72 | GOOD |
| Reference Example 1 | 53 | 0.73 | GOOD |
| Comparative Example 1 | NOT MEASURABLE | NOT MEASURABLE | INADEQUATE FILLING |

According to the results shown in Table 1, in the electrolyte membranes in Examples 1 and 2, the proton conductivity was 53 to 54 S/cm², the methanol permeation flux was 0.72 to 0.73 kg/m²·h, and excellent performance was apparent. These membranes also had a good appearance. In Reference Example 1 conducted by a non-continuous method using the test sample, the proton conductivity was 53 S/cm², and the methanol permeation flux was 0.73 kg/m²·h. It was apparent that the electrolyte membranes manufactured continuously and efficiently in the examples were by no means inferior in performance to the membrane of Reference Example 1. In contrast, the electrolyte membrane of Comparative Example 1 had defects, and the properties of the membrane could not be measured.

Reference Example 2

A polyimide precursor NMP solution containing a total of 8.3 weight % of 3,3',4,4'-biphenyltetracarboxylic acid dianhydride and oxydianiline in a mole ratio of 0.999 was cast on a mirror-polished stainless steel belt, the surface of the solution was covered by a polyolefin microporous membrane (grade name: "UP-3025," manufactured by Ube Industries) acting as a material used to adjust the solvent substitution rate, and this laminate was dipped first in methanol, and then in water. The product was then heat-treated at 320° C. in air, and a polyimide porous film was obtained having the following characteristics: membrane thickness: 20 μm; porosity: 39%; average pore diameter: 0.14 μm; and air permeability: 130 seconds/100 mL.

Example 3

As polymer precursors, 2-acrylamido-2-methylpropane sulfonic acid, N,N'-methylene bisacrylamide, and the product "V-50" manufactured by Wako Pure Chemical Industries as the polymerization initiator were dissolved in deionized water in weight ratios of 93:3:4 to prepare a solution. Then, as shown in FIG. 1, the polyimide porous film (porous resin sheet) 1 created in Reference Example 2 was continuously conveyed and passed through a container containing the abovementioned solution 3, the polyimide porous film was impregnated with the polymer precursor and the like to fabricate a precursor-impregnated/deposited sheet 11. Then, as shown in FIG. 2, a polyethylene terephthalate film having a thickness of 50 µm was brought into contact with both sides of the precursor-impregnated/deposited sheet, the precursor-impregnated/deposited sheet was conveyed while sandwiched between these films, and the polymer precursor was polymerized by heating at 60° C. instead of by the ultraviolet irradiation in Example 1. The polyethylene terephthalate films were then peeled from both sides, and the polymer deposited on the surface of the polymer-filled/deposited sheet was then removed using a blade made of polypropylene. The resulting electrolyte membrane was semi-transparent, and the color of the membrane was darker than that of the polyimide porous film. The surface of the membrane was also devoid of scratches, deformation, tearing, or other damage, and the membrane appearance was good. The weight of this electrolyte membrane was 23 weight % greater than that of the polyimide porous film.

The present invention is not limited by the examples described above, and various modified examples thereof are possible within the range of the present invention according to the purpose, application, or other usage thereof.

EXPLANATIONS OF LETTERS OR NUMERALS

Figure 1:
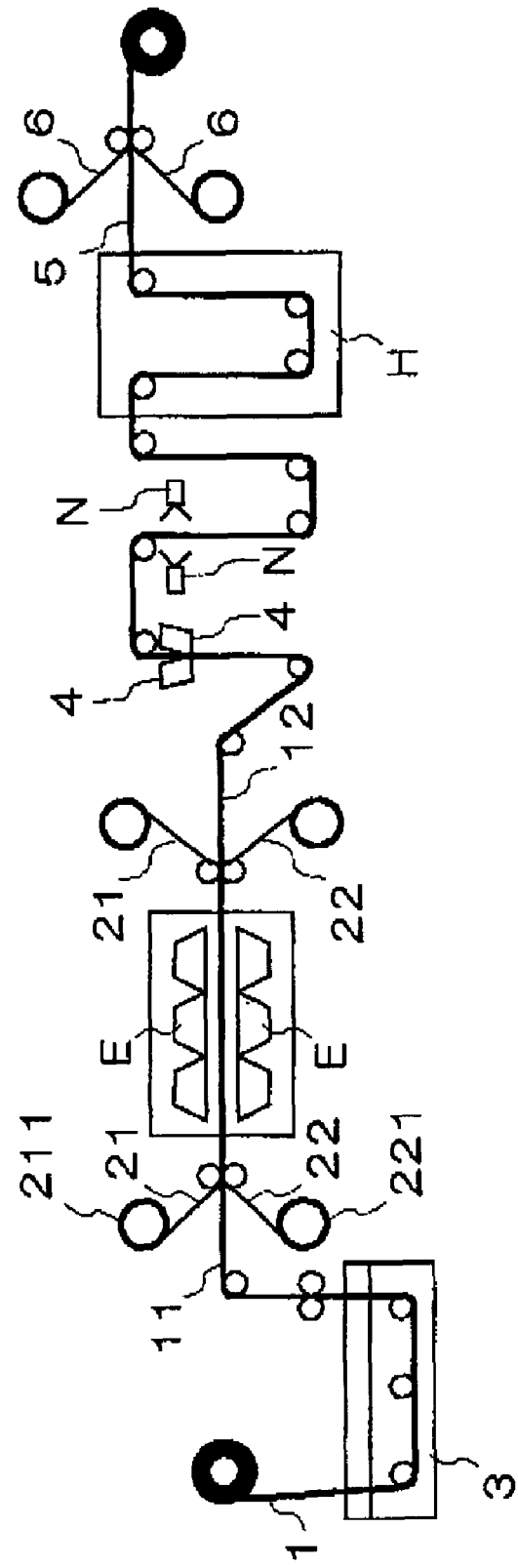
FIG. 1 is a flowchart showing an example of the steps for manufacturing a functional membrane.
Figure 2:
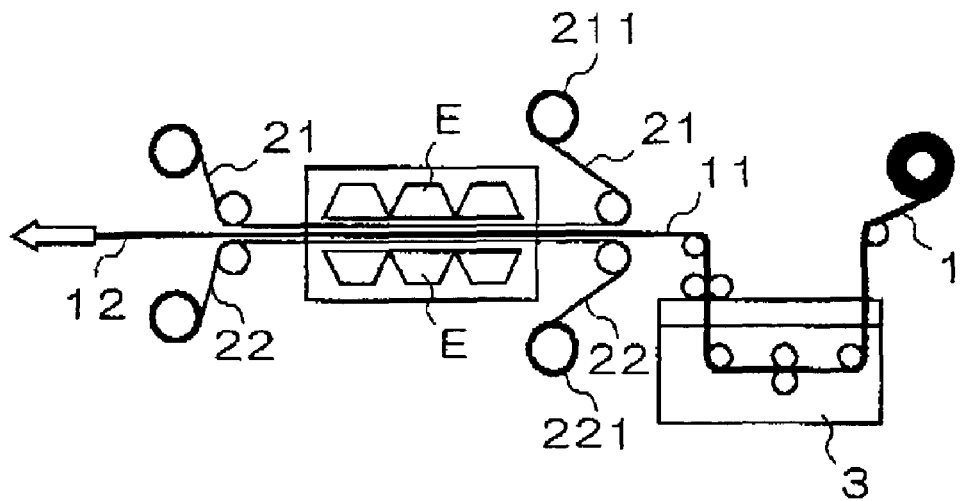
FIG. 2 is a diagram showing the method whereby the first resin film and the second resin film are each continuously delivered and fed from the film feeding source and irradiated with active energy rays while in contact with the precursor-impregnated/deposited sheet, and the polymer precursor is polymerized.
Figure 3:
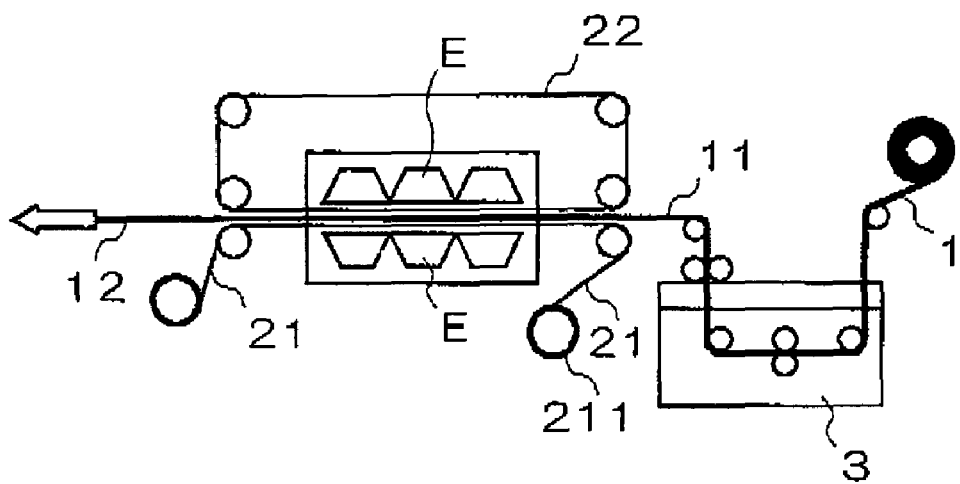
FIG. 3 is a diagram showing the method whereby the first resin film is continuously delivered and fed from the film feeding source and brought into contact with the precursor-impregnated/deposited sheet, the second resin film is caused to form a closed loop in the length direction, and the polymer precursor is irradiated with active energy rays and polymerized in a state in which the second resin film is brought into continuous contact with the precursor-impregnated/deposited sheet while being rotated.
Figure 4:
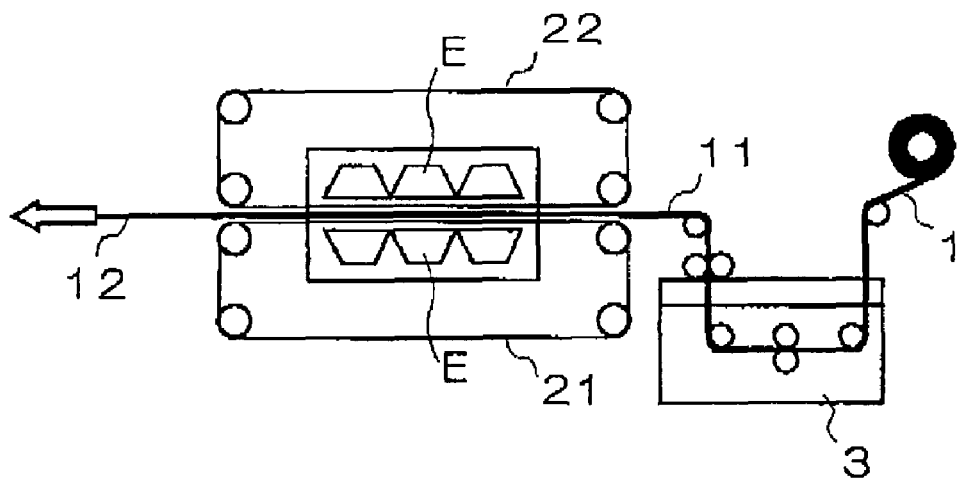
FIG. 4 is a diagram showing the method whereby the first resin film and the second resin film are each caused to form a closed loop in the length direction, these films are rotated at prescribed intervals, the precursor-impregnated/deposited sheet conveyed between these films is irradiated with active energy rays while in a state of continuous contact with both films, and the polymer precursor is polymerized.

1: porous resin sheet(polyethylene porous resin sheet), 11: precursor-impregnated/deposited sheet, 12: polymer-filled/deposited sheet, 21: first resin film, 22: second resin film, 211,221: film feeding sources, 3: dispersion liquid, E: a source of active energy rays, 4: plastic blade, N: spraying nozzle for washing, H: drying apparatus, 5: functional membrane, 6: protective film

The invention claimed is:

1. A method for continuous production of a functional membrane, characterized in comprising:
    an impregnating/depositing step for continuously conveying a porous resin sheet and causing a polymer precursor containing a monomer having a functional group to be impregnated into and deposited on the porous resin sheet;
    a polymerization step for continuously feeding and bringing into contact a first resin film to one side of the precursor-impregnated/deposited sheet comprising the porous resin sheet into which the polymer precursor is impregnated and deposited, continuously feeding and bringing into contact a second resin film to the other side of the precursor-impregnated/deposited sheet, and polymerizing the polymer precursor in a state in which the precursor-impregnated/deposited sheet is sandwiched between the first resin film and the second resin film to generate a polymer;
    a film peeling step for peeling the first resin film and second resin film from the polymer-filled/deposited sheet in which the polymer is filled into and deposited on the porous resin sheet; and
    a polymer removal step for removing the polymer deposited on the surface of the polymer-filled/deposited sheet, wherein the polymer-filled/deposited sheet forming the functional membrane has been added after polymer-filled/deposited sheet.

2. The method for continuous production of a functional membrane according to claim 1, wherein the functional group comprises at least one group selected from a sulfonic acid group and a phosphoric acid group.

3. The method for continuous production of a functional membrane according to claim 1 or 2, wherein at least one film selected from the first resin film and the second resin film is formed into a closed loop in the length direction and brought into contact with the precursor-impregnated/deposited sheet while rotating.

4. The method for continuous production of a functional membrane according to claim 1, wherein at least one film selected from the first resin film and the second resin film is a resin film capable of transmitting an active energy beam, and the polymerization is performed by irradiation of an active energy beam from the resin film side capable of transmitting an active energy beam.

5. The method for continuous production of a functional membrane according to claim 4, wherein the first resin film and the second resin film have different thicknesses, the thin resin film is capable of transmitting an active energy beam, and the active energy beam is irradiated from the side of said thin film.

6. The method for continuous production of a functional membrane according to claim 1, wherein at least the surface of the first resin film and the second resin film that makes contact with the precursor-impregnated/deposited sheet is treated with a mold release agent.

* * * * *